(12) United States Patent
Kleinerman

(10) Patent No.: US 11,140,014 B1
(45) Date of Patent: Oct. 5, 2021

(54) SYSTEM AND METHOD FOR EFFICIENT TIMING ESTIMATION AND TRACKING IN AN ORTHOGONAL FREQUENCY DIVISION MULTIPLEXING (OFDM) COMMUNICATION SYSTEM

(71) Applicant: Silicon Laboratories Inc., Austin, TX (US)

(72) Inventor: Alexander Kleinerman, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/104,054

(22) Filed: Nov. 25, 2020

(51) Int. Cl.
*H04L 27/26* (2006.01)

(52) U.S. Cl.
CPC ........ *H04L 27/265* (2013.01); *H04L 27/2605* (2013.01); *H04L 27/2655* (2013.01)

(58) Field of Classification Search
CPC  H04L 27/265; H04L 27/2655; H04L 27/2605
See application file for complete search history.

(56) References Cited

U.S. PATENT DOCUMENTS

| 9,160,589 | B1* | 10/2015 | Ramlall | H04L 27/2651 |
| 9,742,611 | B2 | 8/2017 | Elenes | |
| 2009/0003423 | A1* | 1/2009 | Oh | H04L 27/2678 |
| | | | | 375/226 |
| 2013/0156138 | A1* | 6/2013 | Nie | H04L 25/0228 |
| | | | | 375/340 |

OTHER PUBLICATIONS mathworks.com, "Channel Estimation—MATLAB & Simulink," Oct. 10, 2020, 8 pages total.
berkely.edu, "E225C—Lecture 16, OFDM Introduction," Date Unknown, 15 pages total.
U.S. Appl. No. 17/104,063, filed Nov. 25, 2020, entitled "System and Method for Detecting of Channel Conditions and Channel Estimation in an Orthogonal Frequency Division Multiplexing (OFDM) Receiver," by Alexander Kleinerman.

* cited by examiner

*Primary Examiner* — Nader Bolourchi
(74) *Attorney, Agent, or Firm* — Trop, Pruner & Hu, P.C.

(57) ABSTRACT

In one aspect, an apparatus includes: a buffer to store orthogonal frequency division multiplexing (OFDM) samples of one or more OFDM symbols; a fast Fourier transform (FFT) engine coupled to the buffer, the FFT engine to receive the one or more OFDM samples from the buffer and convert each of the one or more OFDM samples into a plurality of frequency domain sub-carriers; and a timing control circuit coupled to the buffer. The timing control circuit may control timing based at least in part on a difference between a first correlation sum for a first portion of a cyclic prefix of a first one of the one or more OFDM symbols and a second correlation sum for a second portion of the cyclic prefix.

20 Claims, 8 Drawing Sheets

SYSTEM AND METHOD FOR EFFICIENT TIMING ESTIMATION AND TRACKING IN AN ORTHOGONAL FREQUENCY DIVISION MULTIPLEXING (OFDM) COMMUNICATION SYSTEM

BACKGROUND

Radio receivers are omnipresent in modern technology. In addition to standalone radios for receipt of broadcast radio signals, all manners of tech and non-tech devices include some type of radio receiver (and often paired with a transmitter). Such modem circuitry is present in any device having wireless capabilities. While some broadcast radio signals are transmitted with analog coding (e.g., conventional AM and FM signals), other terrestrial and satellite wireless communication systems use some type of digital encoding. Some example digital radio systems include National Radio System Committee (NRSC-5C, also known as HD™ radio), Digital Audio Broadcasting (DAB), Digital Radio Mondiale (DRM) or other standard.

Timing estimation is an operation performed in a receiver to synchronize with a transmitter to ensure that incoming signals are correctly received and processed. Such timing estimation is used to ensure that sampling of received information occurs at the correct time so that proper downstream processing can occur. In one example digital radio communication system, message information is communicated in orthogonal frequency division multiplexing (OFDM) symbols. A conventional technique to perform timing estimation in such a system involves performing correlations on received symbols. These correlations require a large number of complex multiplication and other operations, which can incur a significant latency penalty, delaying efficient signal acquisition times and additionally consuming significant computing resources. In addition, conventional correlation techniques suffer performance loss when multi-path channels conditions present.

SUMMARY OF THE INVENTION

In one aspect, an apparatus includes: a buffer to store orthogonal frequency division multiplexing (OFDM) samples of one or more OFDM symbols; a fast Fourier transform (FFT) engine coupled to the buffer, the FFT engine to receive the one or more OFDM samples from the buffer and convert each of the one or more OFDM samples into a plurality of frequency domain sub-carriers; and a timing control circuit coupled to the buffer. The timing control circuit may control a timing of the one or more OFDM symbols based at least in part on a difference between a first correlation sum for a first portion of a cyclic prefix of a first one of the one or more OFDM symbols and a second correlation sum for a second portion of the cyclic prefix.

In an example, the timing control circuit is to control the timing to according to a difference between the first correlation sum and the second correlation sum of the one or more OFDM symbols received via a multi-path channel. The timing control circuit may adjust the timing until the first correlation sum is at least substantially equal to the second correlation sum. In different examples, the timing control circuit may control a timing of the buffer to control the timing of the one or more OFDM symbols, and/or adjust a sampling clock signal to control the timing of the one or more OFDM symbols.

In an example, the timing control circuit comprises: a cyclic prefix correlator to: calculate first cyclic prefix correlations for the first portion of the cyclic prefix and second cyclic prefix correlations for the second portion of the cyclic prefix; and calculate first guard band correlations for one or more first guard band samples adjacent the first portion of the cyclic prefix and second guard band correlations for one or more second guard band samples adjacent the second portion of the cyclic prefix; and a summer to calculate the first correlation sum based on the first cyclic prefix correlations and the first guard band correlations and calculate the second correlation sum based on the second cyclic prefix correlations and the second guard band correlations.

The timing control circuit may further include an error determination circuit to determine a timing error based on a comparison of the first correlation sum and the second correlation sum. The timing control circuit further comprises an error tracking circuit to maintain a first count and a second count based on the timing error for a plurality of comparisons of the first correlation sum and the second correlation sum. The timing control circuit may compare the first count to the second count and adjust at least one of a timing of an output of the at least one of the one or more OFDM symbols from the buffer and a sampling clock signal based on the comparison of the first count to the second count. The timing control circuit may update one of the first count and the second count when an absolute value of the timing error exceeds a predetermined value.

In another aspect, a method includes: receiving, in a receiver, a radio frequency (RF) signal; processing, in the receiver, the RF signal to obtain a plurality of OFDM symbols, each of the plurality of OFDM symbols comprising cyclic prefix (CP) samples and information samples; computing a first correlation sum for correlations of a first portion of the CP samples and a guard band portion of the information samples adjacent the first portion of the CP samples; computing a second correlation sum for correlations of a second portion of the CP samples and a guard band portion of the information samples adjacent the second portion of the CP samples; determining a timing error based at least in part on the first correlation sum and the second correlation sum; and adjusting a timing of the receiver based at least in part on the timing error.

In an example, the method further comprises determining the timing error based on a comparison of the first correlation sum and the second correlation sum. The method further comprises maintaining a first count and a second count based on the timing error for a plurality of comparisons of the first correlation sum and the second correlation sum. The method also may adjust the timing of the receiver in a first direction when the first count exceeds the second count. In different examples adjusting the timing of the receiver comprises adjusting at least one of a first control signal provided to a buffer of the receiver that stores the plurality of OFDM symbols and a second control signal that controls a sampling clock signal used to sample the RF signal. The method further may include computing correlations for an entire OFDM symbol for an initial set of the plurality of OFDM symbols to obtain a receiver lock, and computing the first correlation sum and the second correlation sum after obtaining the receiver lock.

In yet another aspect, an apparatus includes: an amplifier to receive and amplify a RF signal; a mixer coupled to the amplifier to downconvert the RF signal to a second frequency signal using a mixing signal; a digitizer coupled to the mixer to digitize the second frequency signal into samples of a plurality of OFDM symbols using a sampling clock signal; a storage coupled to the digitizer to store the plurality of samples of the plurality of OFDM symbols; and a feedback circuit coupled to the storage. The feedback circuit may control at least one of the sampling clock signal and the storage based at least in part on a comparison between a first correlation sum for a first portion of a cyclic prefix of a first one of the plurality of OFDM symbols and a second correlation sum for a second portion of the cyclic prefix.

In an example, the feedback circuit comprises: a cyclic prefix correlator to: calculate first cyclic prefix correlations for the first portion of the cyclic prefix and second cyclic prefix correlations for the second portion of the cyclic prefix; and calculate first guard band correlations for one or more first guard band samples adjacent the first portion of the cyclic prefix and second guard band correlations for one or more second guard band samples adjacent the second portion of the cyclic prefix; and a summer to calculate the first correlation sum based on the first cyclic prefix correlations and the first guard band correlations and calculate the second correlation sum based on the second cyclic prefix correlations and the second guard band correlations.

In an example, the feedback circuit is to determine a timing error based on a comparison of the first correlation sum and the second correlation sum, maintain a first count and a second count based on the timing error for a plurality of comparisons of the first correlation sum and the second correlation sum, and adjust at least one of a timing of an output of the plurality of OFDM symbols from the storage and the sampling clock signal based on a comparison of the first count to the second count.

DETAILED DESCRIPTION

In various embodiments, a radio receiver is implemented with a timing control circuit that is configured to efficiently estimate timing for an incoming radio frequency (RF) signal using minimal information of one or more incoming symbols. Embodiments may be used in a variety of receiver implementations for use in determining the timing estimate for incoming OFDM communications. While embodiments are not limited in this regard, implementations may be used in connection with a Digital Radio Mondiale (DRM) digital radio communication system in accordance with a given DRM specification. Other implementations can be used in connection with other digital communication techniques, including digital TV (e.g., one or more Digital Video Broadcasting (DVB) standards), Integrated Digital Services Broadcasting (IDSB), cellular techniques such as Long Term Extension (LTE) and 5G, or other receivers using OFDM signaling.

While a timing control circuit can be implemented in different manners, in embodiments herein this circuit may be implemented as a feedback circuit that receives downconverted digitized symbols in the time domain (prior to these symbols being converted to the frequency domain for further processing including decoding and demodulation). Further, in different implementations this feedback circuit may control one or more components of the receiver to adjust timing. Regardless of the mechanism of timing control, as a result of adjusting the timing, a next OFDM symbol will be sampled from a different point in time.

Figure 1A:
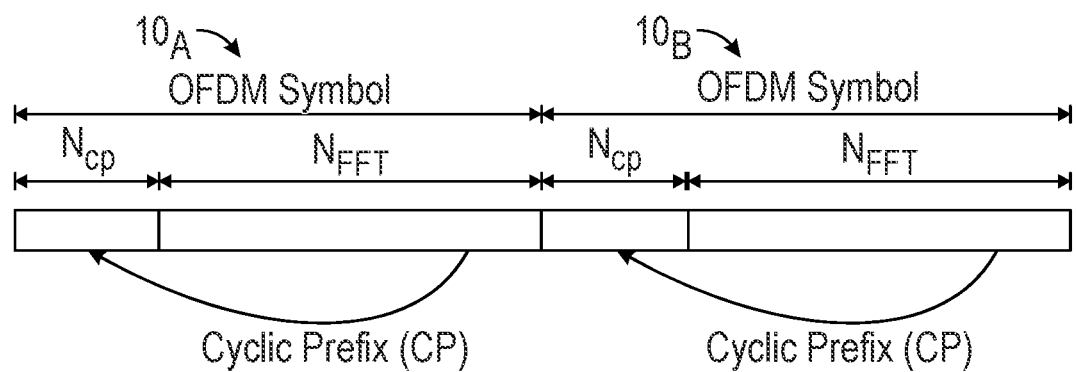
FIG. 1A is a diagram illustrating example OFDM symbols.

Referring now to FIG. 1A, shown is a diagram illustrating example OFDM symbols. Specifically in FIG. 1A, OFDM symbols $10_A$, $10_B$ are illustrated. Each symbol 10 is formed of a cyclic prefix (CP) having a plurality of samples and a data portion having a larger set of samples that includes the samples of the cyclic prefix and additional samples. As such, each OFDM symbol 10 has $N_{cp}+N_{FFT}$ samples (complex valued). Note that the number of cyclic prefix samples and FFT samples can vary in different systems. For example in DRM there are multiple options for $N_{FFT}$ and $N_{cp}$, including: $[N_{FFT}, N_{cp}]$=>[576; 64]; [288,32]; [144,16]; [512,128]; [256,64]; [128,32] as a subset of DRM techniques, more generically $[N_{FFT}, N_{cp}]$.

The value of the sample at location i may be defined as Xi. Accordingly, then according to a CP definition:

$$X_i = X_{i+N_{FFT}} \text{ for } 0 \leq i < N_{cp} \qquad \text{[Equation 1]}.$$

To ensure good synchronization between a transmitter and a receiver, the receiver may perform one of various techniques to identify timing. In many receivers, a conventional technique for identifying a beginning of a cyclic prefix of an OFDM symbol is performed based on correlation processing. As one particular example, this correlation technique may determine a cyclic prefix correlation for a length of summation Np. Note that the k value is calculated for [0; $N_{FFT}+N_{cp}-1$], according to:

$$\theta_k = \sum_{i=0}^{N_{cp}-1} X_{i+k} * X^*_{i+k+N_{FFT}}. \qquad \text{[Equation 2]}$$

From this correlation, the CP can be identified by finding a $\max(|\theta_k|)$ for $0 \leq k < N_{FFT}$.

Figure 1B:
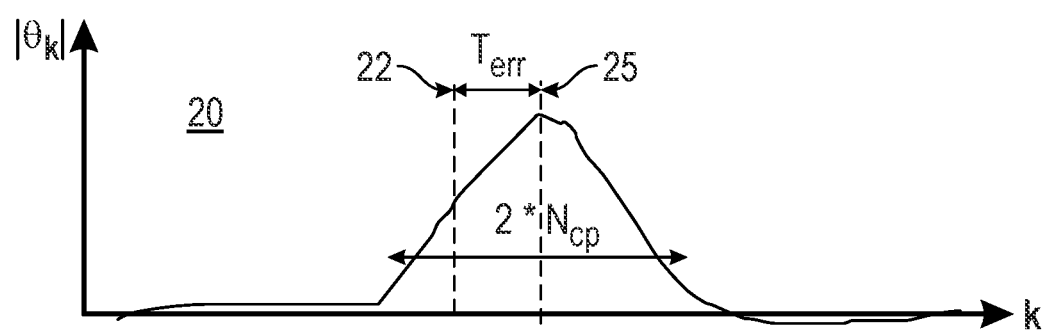
FIG. 1B is a graphical illustration of a relationship between a correlation value and a given sample within a symbol.

Referring now to FIG. 1B, shown is a graphical illustration of a relationship between a correlation value (y-axis) and a given sample k (x-axis) within a symbol. As shown, illustration 20 describes a timing correction between a predicted peak position at a point 22, while in fact an actual peak position is at a point 25. As such, an expected peak is at point 22 and calculated OFDM symbol start is according to point 22. Accordingly, a timing loop is to be corrected so that the next predicted value will be closer to the measured position of the peak. As such, a timing correction may be a function of this timing error, $f(T_{err})$. While this correlation technique may work well in some situations, difficulties arise when a received signal passes through a multi-path channel. In this instance, a peak is not so definite, and this peak may jump some number of $N_\tau$ symbols corresponding to a multi-path delay. Further, the timing error measurement can be very jumpy. Therefore a timing loop using this timing error may require a very long term averaging, making it very slow.

Thus while a CP correlation technique may work well with very short multi-path situations, it may face difficult challenges when the multi-path is long. One particular situation that creates a problem is when the multi-path has two equal paths with a significant delay between them.

Another issue with a conventional technique is the complexity involved in calculating the correlations. Specifically, there are $N_{cp}$ complex multiplications per $\theta_k$. Thus for a complete OFDM symbol, this technique incurs a total of $N_{cp}*(N_{cp}+N_{FFT})$ complex multiplications and $N_{cp}+N_{FFT}-1$ comparisons.

Instead with embodiments, a more efficient manner of identifying a beginning of an OFDM symbol can be used to implement a timing estimate. More specifically, rather than performing a correlation across an entire OFDM symbol, only samples inside a cyclic prefix (and some small number of guard band samples adjacent to the cyclic prefix) may be used.

Figure 1C:
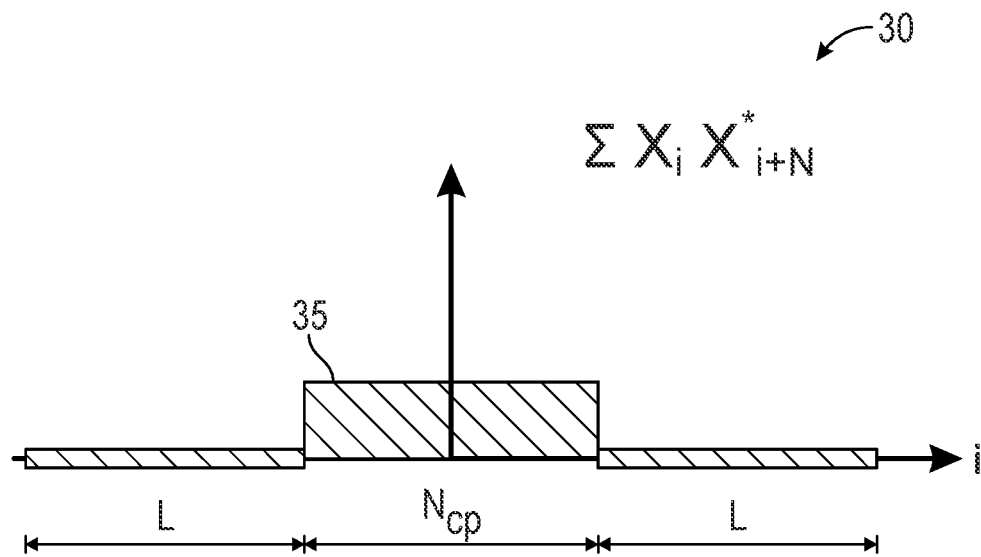
FIG. 1C is a block diagram illustrating a statistical expected value of a correlation performed in accordance with an embodiment.

Referring now to FIG. 1C, shown is a block diagram illustrating a statistical expected value of the $X_i X_{i+N}^*$ (correlation herein) depending on the position i in the OFDM symbol. As shown in FIG. 1C, a graphical illustration 30 includes an expected value 35 of correlation, which will be equal to an energy of the signal plus noise within the cyclic prefix and energy of the noise only outside the cyclic prefix. As seen, these values are much greater than the minimal correlation values for guard band samples L on either side of the guard band. Note that his guard band value L corresponds to an uncertainty of time with respect to the cyclic prefix. In embodiments, L may be set between approximately 8 and 16 for a DRM system in which a CP includes 32 symbols. In general L may be set large enough in case the actual timing changes too fast or the expected operating conditions are very noisy. If in actual operation, actual timing is slower or the SNR conditions better than anticipated, the value of L may be reduced.

In an embodiment, a minimal number of correlations may be performed and summed according to Equations 3 and 4. As shown, two correlation sums are determined, each for a portion of a CP and some number of adjacent samples.

$$\theta_{left} = \Sigma_{i=-L}^{N_{cp}/2-1} X_i^* X_{i+N_{FFT}}^*$$ [Equation 3]

$$\theta_{right} = \Sigma_{i=N_{cp}/2}^{N_{cp}+L-1} X_i^* X_{i+N_{FFT}}^*$$ [Equation 4]

A resulting timing error may be determined in accordance with Equation 5. As shown, this timing error may be determined based on a difference between absolute values of the two correlation sums. And a timing correction is a function of this timing error.

$$T_{err} = |\theta_{right}| - |\theta_{left}|$$ [Equation 5]

Figure 1D:
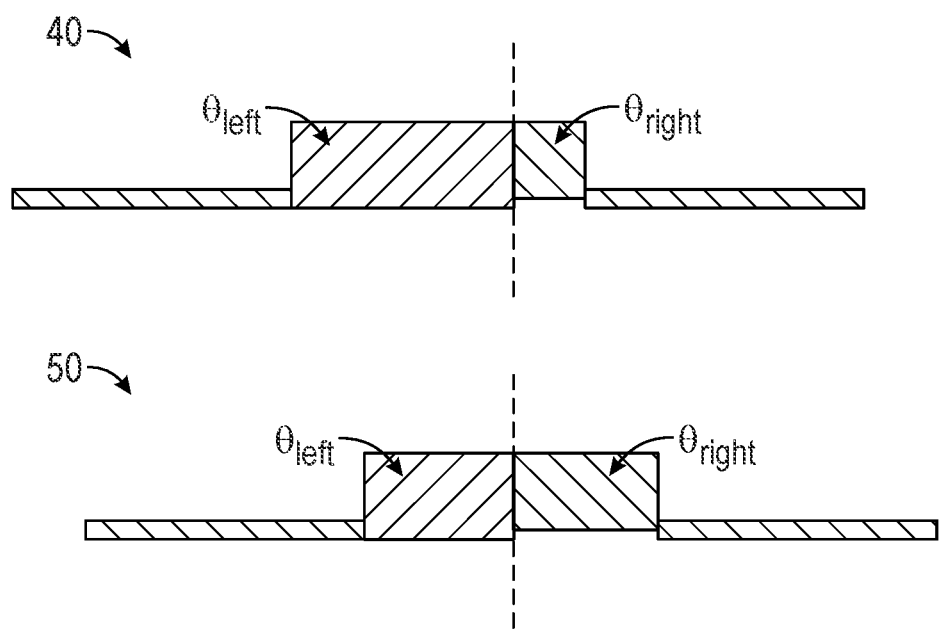
FIG. 1D shows graphical illustrations of exemplary correlation sums in accordance with an embodiment.

FIG. 1D shows graphical illustrations 40 and 50 of exemplary correlation sums. As illustrated in FIG. 1D, in the instance where the left side correlation sum ($\theta_{left}$) exceeds the right side correlation sum ($\theta_{right}$), the area on the left side is larger than the area on the right side. As such, a timing control circuit in accordance with an embodiment may be configured to correct timing until the areas on each side are at least substantially equal.

With an embodiment herein, these two correlation sums are calculated, instead of needing to determine such sums for the full number of samples of a CP (or an entire symbol). And further note that this error determination, which is a measure of a difference in energy between the two correlation sums, does not have issues with regard to trying to determine a peak in correlation values, such as described above with regard to FIG. 1B, which can be very difficult in instances of a multi-path channel, as described below.

Figure 1E:
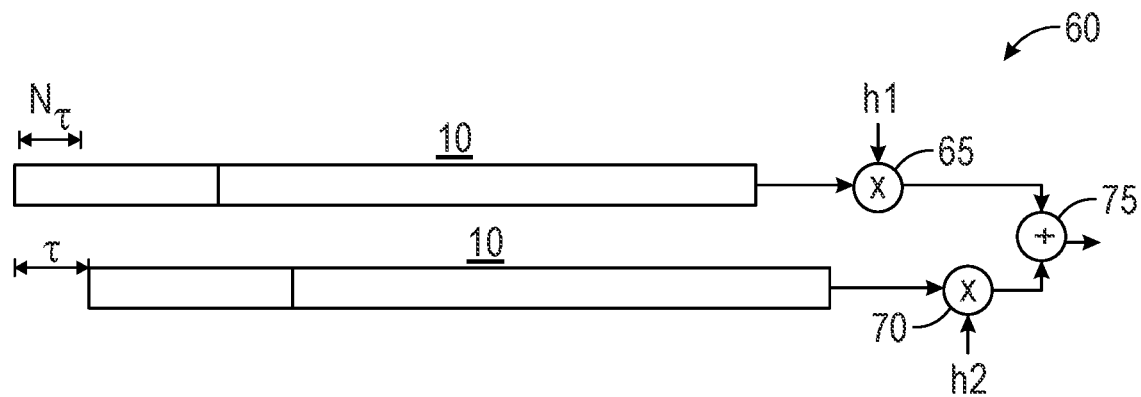
FIG. 1E is an illustration of symbol reception in a multi-path channel.
Figure 1F:
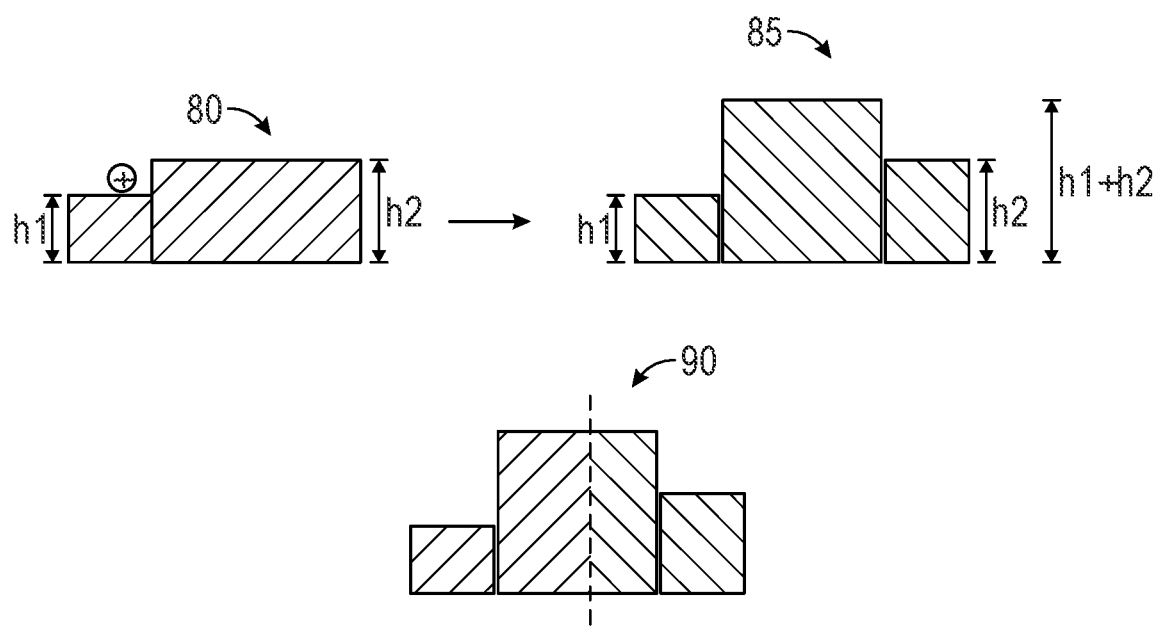
FIG. 1F is an illustration of a tracking estimate result in accordance with an embodiment.

When an OFDM signal passes through a multi-path channel, there are delays inherent between the two channels. As shown in FIG. 1E, a signal contribution from a first channel h1 and a second channel h2 results in a combined signal with different correlation values. Specifically, a symbol 10 received via two channels (represented by multiply operations 65, 70) results in a summed symbol (represented at an output of summer 75). With embodiments however, timing estimation may be performed such that the correlation sums substantially equal each other, as the algorithm of Equations 3-5 converges to a center of mass of the multi-path channel. That is, as shown in FIG. 1F, resulting correlation sums 80 and 85 representing correlation sums from the multiple channels (80 and 85), result in a center of mass 90 of the multi-path channel.

In embodiments herein, a reduced number of correlations may be computed. Here, a total of ($N_{cp}$+2L) complex multiplications may be performed. Still further with embodiments, this technique provides better performance than a conventional correlation technique in the face of long multi-path channels. More specifically, with embodiments herein, the computation complexity is ($N_{cp}$+2L) vs $N_{cp}^*$ ($N_{cp}$+$N_{FFT}$) where 2L<N_FFT. In this way, the complexity is at least CP times smaller.

Figure 2:
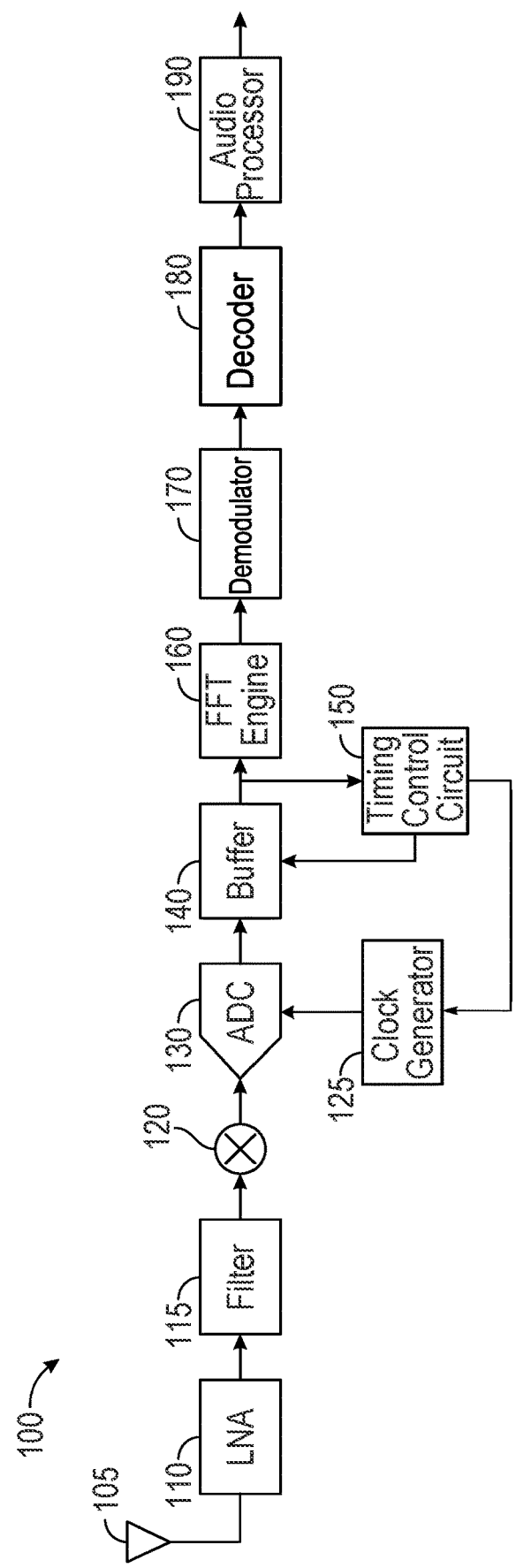
FIG. 2 is a block diagram of a receiver in accordance with an embodiment.

Referring now to FIG. 2, shown is a block diagram of a receiver in accordance with an embodiment. As shown in FIG. 2, receiver 100 may include a signal processing path having various components. Embodiments can be incorporated in different types of receiver systems. In some embodiments, receiver 100 may be a single-die integrated circuit such as a CMOS die having mixed signal circuitry including both analog and digital circuitry.

With reference to receiver 100, an incoming RF signal that includes digital radio signals according to a given digital broadcast specification may be received over the air via an antenna 105. As used herein, the terms "digital radio" or "digital radio broadcast signal" are used interchangeably and are intended to correspond to broadcast radio communication that occurs digitally. Such communications may be in accordance with various standards such as a HD™ radio, DAB, DRM or other standard.

As shown in FIG. 2, an incoming radio frequency (RF) signal received via antenna 105 is provided to a low noise amplifier (LNA) 110, which amplifies the RF signal. In turn, LNA 110 is coupled to a filter 115, which may perform filtering of the received RF signal. Understand while shown with two RF front end blocks, a receiver may include additional RF front end circuitry in other examples. In turn, the filtered RF signal is provided to a mixer 120, which in an embodiment may be implemented as a complex mixer. In embodiments herein mixer 120 may downconvert the RF signal to a lower frequency signal using a mixing signal (not shown in FIG. 2). In a particular embodiment, this lower frequency signal may be, e.g., a low-intermediate frequency (IF) or zero-IF signal. This downconverted signal is an in-phase/quadrature phase (IQ) signal.

The resulting downconverted signal is provided to an analog-to-digital converter (ADC) 130, where the signal can be digitized into a digital signal at a sampling rate according to a clock signal received from a clock generator 125. In an embodiment, clock generator 125 may be implemented as a local oscillator, phase lock loop or other such clock generation circuit. In an embodiment in which the sampling clock signal and mixing signal are at the same frequency, clock generator 125 also may provide the mixing signal to mixer 120. Note that in some embodiments, either before or after digitization, channelization may be performed to generate a channelized signal. In an OFDM system, a plurality of samples forms an OFDM symbol of an incoming data stream.

In turn, samples are provided to a buffer 140, which may be implemented as a first in first out (FIFO) 140. The incoming samples are stored in buffer 140, and are then output to a main digital signal processing path including a fast Fourier transform (FFT) engine 160, which generates frequency domain OFDM symbols from incoming time domain OFDM symbols. In one embodiment, each incoming time domain OFDM symbol can be processed by FFT engine 160 into a plurality of sub-carriers. Note that the number of sub-carriers corresponding to a given OFDM symbol may vary depending upon bandwidth of signal and a time duration of the OFDM symbol (without a cyclic prefix).

As further shown in FIG. 2, the incoming time domain OFDM symbols stored in buffer 140 also may be provided to a timing control circuit 150. In embodiments herein, timing control circuit 150 may be configured to perform timing estimation to determine a synchronization of the OFDM symbols. In this way, the symbols can be provided to downstream digital processing circuitry in correct synchronization. While embodiments may vary, in examples herein, timing control circuit 150 may determine a timing estimate and provide control signals to buffer 140 and/or clock generator 125 to control timing. As such, timing control circuit 150 acts as a feedback circuit to control timing based on the OFDM symbols themselves. More specifically as described herein, only a portion of an OFDM symbol, namely a CP and a limited guard band around this CP, is used to estimate timing.

The sub-carrier outputs from FFT engine 160 form a frequency domain symbol that in turn is provided to a demodulator 170, which may demodulate the incoming sub-carriers and provide demodulated sub-carriers. In an embodiment, demodulator 170 may be a sub-symbol decoder to produce a soft bit per sub-carrier. In turn, the demodulated sub-carriers may be provided to a decoder 180, where error correction and information bit extraction is performed. In turn, the resulting demodulated signal may be provided to an audio processor 190 for audio processing. The encoded audio signal is then provided to an audio source decoder (not shown for ease of illustration in FIG. 2) to generate source audio. In the case of a data link, information bits may be provided to a data processor. Although shown as individual components, understand that portions of the receiver after ADC 130 to the end of the signal processing path of FIG. 2 can be implemented in a digital signal processor (DSP).

While described with this particular embodiment in FIG. 2, other implementations are possible, and additional circuitry can be present. For example, in some embodiments, additional circuitry including a deinterleaver, depuncturer, and a forward error correction (FEC) decoder may be present, to strip parity bits and provide the information bits. In addition, a timing control circuit may be configured in other types of hardware, may be realized via combinations of hardware, firmware, and/or software, and also may be implemented within a microcontroller or DSP.

Figure 3:
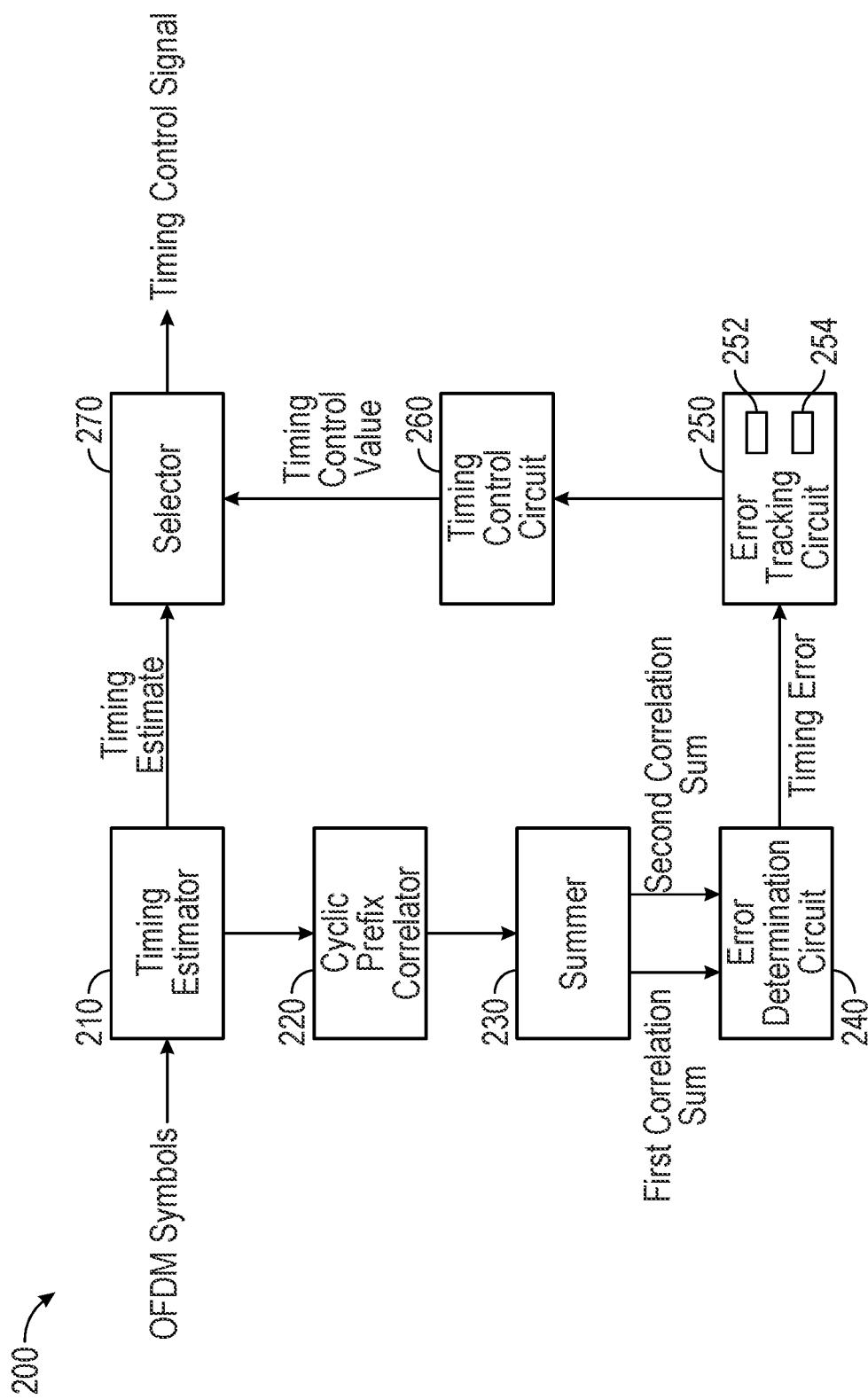
FIG. 3 is a block diagram of a timing control circuit in accordance with an embodiment.

Referring now to FIG. 3, shown is a block diagram of a timing control circuit in accordance with an embodiment. As shown in FIG. 3, a timing control circuit 200 receives incoming OFDM symbols. In one embodiment, timing control circuit 200 may receive incoming time domain OFDM samples of one or more OFDM symbols from a buffer. More specifically, the received symbols are provided to a timing estimator 210. Timing estimator 210 may generate a timing estimate based on one or more of the OFDM symbols. Although embodiments are not limited in this regard, a conventional correlation technique may be used to generate this timing estimate.

This timing estimate is thus an initial timing estimate that is used to provide coarse identification of the beginning of one or more of the symbols. As shown, this timing estimate is provided to a selector 270, which in an embodiment may be implemented as a multiplexer or other selection circuit. Before a timing estimate in accordance with an embodiment is determined, selector 270 may be configured to provide this received timing estimate as a timing control signal. This timing control signal may be used to control receiver circuitry, such as buffer circuitry to control output from the buffer. In this or another implementation, the timing control signal also may be provided to a clock generator, which may control a sampling clock of an ADC to control sampling rate based on the determined OFDM timing estimate.

Still with reference to FIG. 3, the received OFDM symbols are further provided from timing estimator 210 to a cyclic prefix correlator 220. In embodiments herein, cyclic prefix correlator 220 may generate correlations for samples of a cyclic prefix of the OFDM symbols, along with some number of samples adjacent to the cyclic prefix. With embodiments herein, the timing estimate determined in timing estimator 210 may be used to indicate an approximate or estimated location of the cyclic prefix. In turn, correlation values for the CP and guard band samples adjacent to the CP are provided to a summer 230. In embodiments herein, summer 230 may be configured to generate two separate sums, namely a first correlation sum and a second correlation sum. In an embodiment, the first correlation sum is determined for a first portion of the CP and guard band samples adjacent this first portion of the CP, and the second correlation sum is determined for a second portion of the CP and guard band samples adjacent this second portion of the CP.

Still with reference to FIG. 3, these correlation sums are provided to an error determination circuit 240, which may determine a timing error based on these two correlation sums. In turn, this timing error is provided to an error tracking circuit 250. In embodiments herein, error tracking circuit 250 may be configured to maintain two counts, e.g., in a first counter 252 and a second counter 254. This first count may correspond to instances of the timing error in which an absolute value of the first correlation sum exceeds an absolute value of the second correlation sum and in turn, the second count may correspond to instances of the timing error in which an absolute value of the second correlation sum exceeds an absolute value of the first correlation sum.

These counts may be provided to a timing control circuit 260. In embodiments herein, timing control circuit 260 may be configured to determine whether to adjust timing in a given direction, based at least in part on these first and second counts. In turn, timing control circuit 260 outputs a timing control value that corresponds to a measure of a timing estimate. When this signal is available, selector 270 may be configured to provide this timing control value as the timing control signal, instead of the initial timing estimate. Understand while shown at this high level in the embodiment of FIG. 3, many variations and alternatives are possible.

Figure 4:
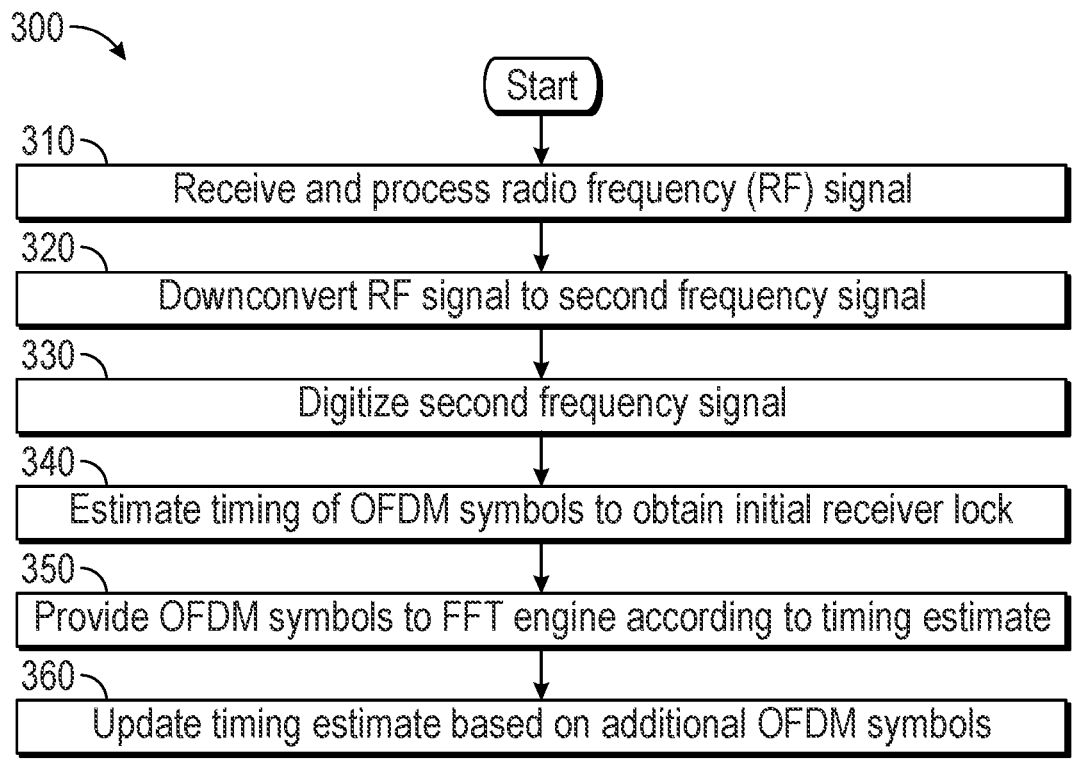
FIG. 4 is a flow diagram of a method in accordance with an embodiment.

Referring now to FIG. 4, shown is a flow diagram of a method in accordance with an embodiment. More specifically as shown in FIG. 4, method 300 is a high level method of generating a timing estimate in accordance with an embodiment. As such, method 300 may be performed by various hardware circuitry such as may be present in a receiver, e.g. receiver 100 of FIG. 2, along with firmware and/or software, in some implementations.

As illustrated, method 300 begins by receiving and processing an RF signal (block 310). This RF signal may be received via an antenna and provided to a signal processing path of the receiver where it can be processed, e.g., by way of amplification or other gain control, filtering, channelization or so forth. Next at block 320 the RF signal may be downconverted to a second, lower frequency signal. As an example, this second frequency signal can be at a low IF or zero IF level. Then at block 330 this second frequency signal is digitized, e.g., in an ADC. Note that additional operations may be performed on this digital signal, including various signal processing, time-to-frequency conversion and so forth to recover the message content and provided it to a destination such as an audio output device.

Still referring to FIG. 4, next at block 340 a timing of the OFDM symbols may be estimated. More specifically here, an initial receiver lock may be obtained from one or more OFDM symbols. As one example, a conventional correlation technique can be performed to determine this initial timing estimate. Note that this conventional technique requires a large number of correlations to be calculated as discussed above.

Still with reference to FIG. 4, in turn at block 350, these OFDM symbols may be provided to an FFT engine according to the timing estimate, where they may be converted from the time domain to the frequency domain as a plurality of sub-carriers. Note that with this initial timing estimate, a symbol beginning may not exactly correspond with the true beginning of the symbol, leading to undesired noise and performance loss.

Thus as illustrated, the initial timing estimate may be updated at block 360. More specifically, as additional OFDM symbols are received, a timing estimate may be updated using techniques in accordance with an embodiment. In this way, a minimal amount of CP correlations can be calculated and used to determine a timing error based on two correlation sums as described. Thus receiver timing may be updated and maintained with lesser complexity and more speed.

Figure 5:
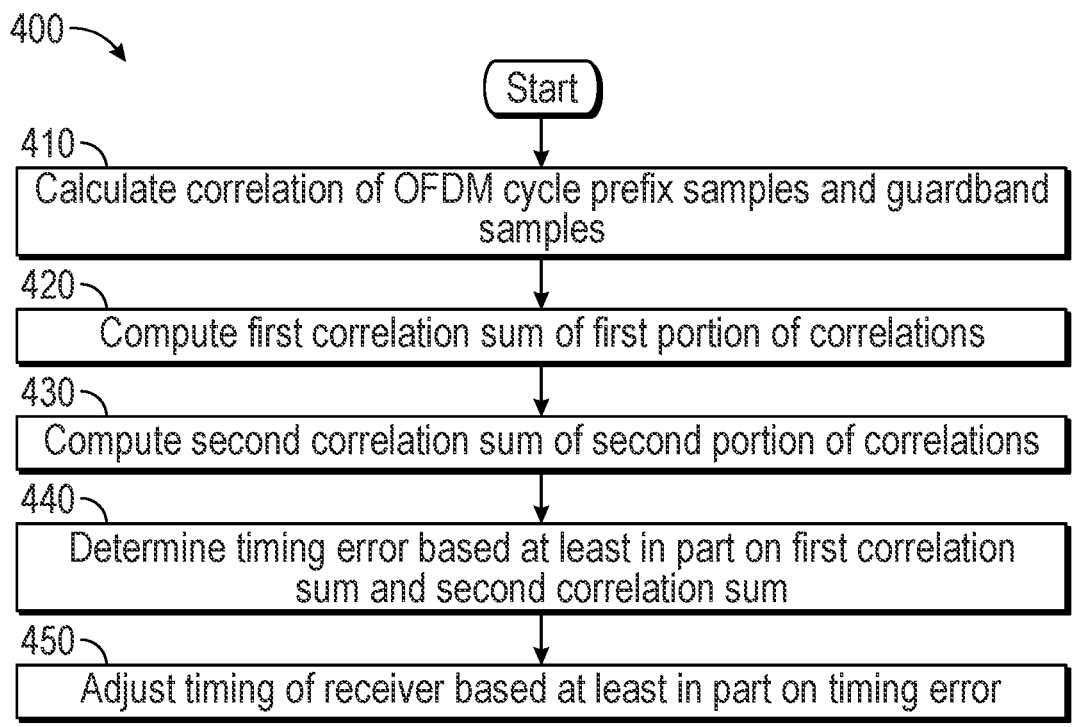
FIG. 5 is a flow diagram of a method in accordance with another embodiment.

Referring now to FIG. 5, shown is a flow diagram of a method in accordance with another embodiment. More specifically, method 400 is a method for determining a timing estimate using techniques accordance with an embodiment. As such, method 400 may be performed by various hardware circuitry of a receiver such as a timing control circuit, along with firmware and/or software, in some implementations.

Method 400 begins by calculating a correlation of CP samples and guard band samples of a given OFDM symbol (block 410). From these correlations, a first correlation sum can be computed for a first portion of an OFDM symbol (block 420). This first portion may correspond to the correlations for a right side portion of the CP, along with some number of guard band samples adjacent to this right side portion.

Next at block 430, a second correlation sum can be computed for a second portion of the OFDM symbol. This second portion may correspond to the correlations for a left side portion of the CP, along with some number of guard band samples adjacent to this left side portion.

Still with reference to FIG. 5, control next passes to block 440, where a timing error may be determined. More specifically, this timing error may be determined based at least in part on the first correlation sum and the second correlation sum. Finally, at block 450 a timing of the receiver may be adjusted based at least in part on this timing error. As one example, in response to the timing error, timing of the receiver may be adjusted. For example, a read pointer for a buffer that stores OFDM samples can be adjusted in a given direction based on this timing error. Or in other cases, a sampling clock for an ADC can have its frequency adjusted in response to this timing error.

In yet other implementations, a combination of these techniques or another control technique may be used. For example, a sample rate converter may be implemented in the receive chain before the timing loop having an adjustable rate according to the timing error, which may be equivalent to adjusting the sampling clock of the ADC. In yet other embodiments, a combination of read pointer adjustment for a buffer that stores OFDM samples and sampling clock rate adjustment can be used.

Note that in other embodiments, instead of adjusting timing based on a determination of a single timing error, the operations described in blocks 410-440 may be performed multiple times, and an averaging or other smoothing process can be used to adjust timing after a number of different timing error samples have been determined. Understand while shown at this high level in the embodiment of FIG. 5, many variations and alternatives are possible.

Figure 6:
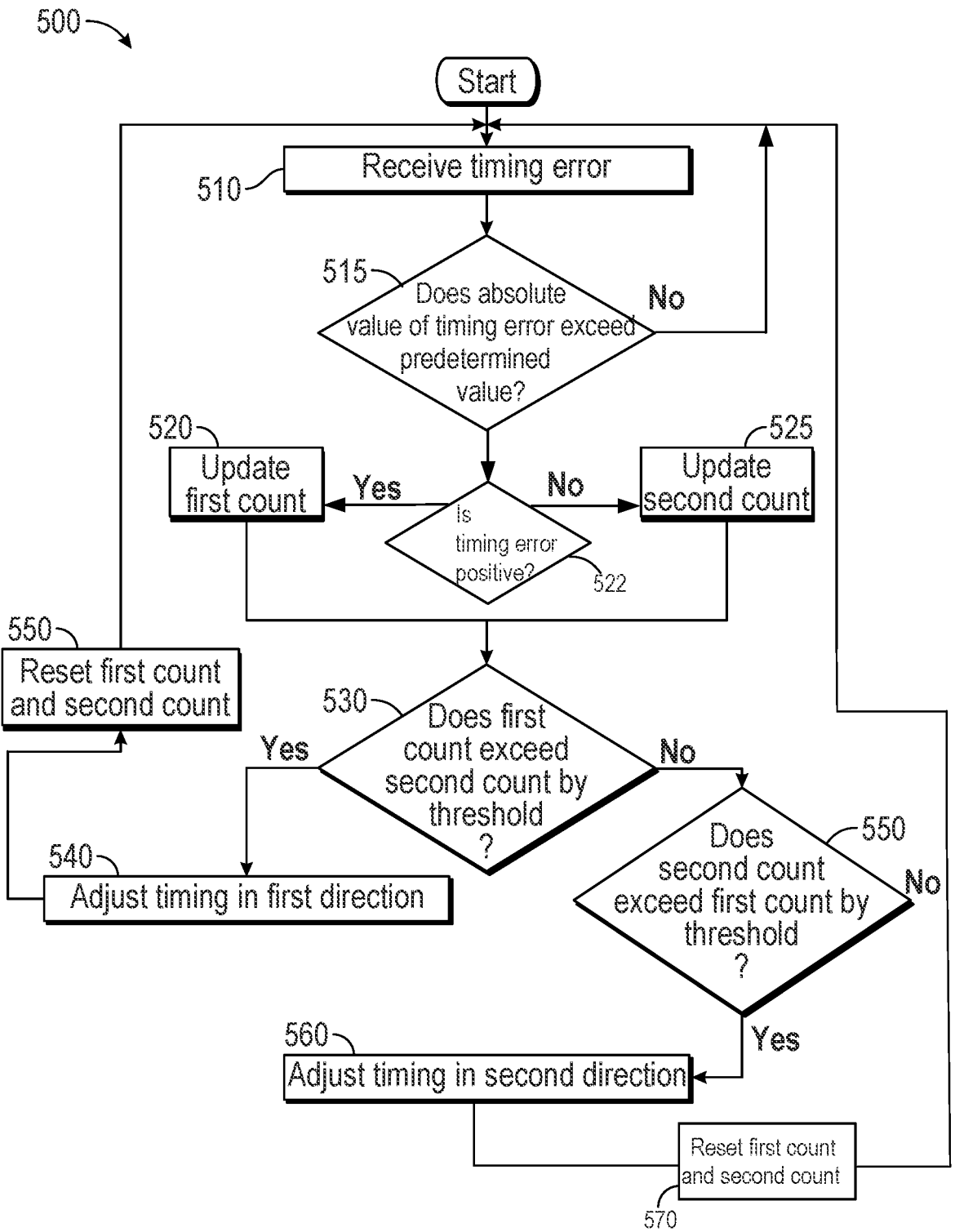
FIG. 6 is a flow diagram of a method in accordance with another embodiment.

Referring now to FIG. 6, shown is a flow diagram of a method in accordance with another embodiment. As such, method 500 may be performed by various hardware circuitry such as a timing control circuit, e.g. circuit 200 of FIG. 3, along with firmware and/or software, in some implementations. As shown, method 500 begins by receiving a timing error (block 510). This timing error may be received within circuitry of a timing control circuit. For example, with reference back to FIG. 3, this timing error may be received in error tracking circuit 250. Next it is determined at diamond 515 whether an absolute value of the timing error exceeds a predetermined value. In one embodiment, this predetermined value may be set to a given threshold level. If the absolute value exceeds this predetermined value, control passes to diamond 522, where it is determined whether the timing error is positive, meaning that the difference between a first correlation sum (for the right side portion of a CP and some adjacent samples) exceeds a second correlation sum (for the left side portion of the CP and some adjacent samples). If so, control passes to block 520 where a first count may be updated. Otherwise, control passes to block 525 where a second count may be updated.

As such, the first count provides a positive difference in which the first correlation sum exceeds the second correlation sum. In turn, the second count is a count of negative differences, namely where the second correlation sum exceeds the first correlation sum. Stated another way, these counts are updated based on a sign of the timing error.

Still with reference to FIG. 6, control next passes to diamond 530 to determine whether this first count exceeds the second count by a threshold amount. Note that this threshold amount can be set to different levels in different implementations. For example, in one embodiment the threshold may be set between approximately 50 and 200, such that a measure of hysteresis is provided. In this way, timing does not change on an interval of one or a small number of OFDM symbols. If it is determined that the first count exceeds the second count by this threshold level, control passes to block 540 where timing may be adjusted in a first direction. Continuing with the present example, this first direction is to move the timing later. Thereafter, control passes to block 550 where the first and second counts may be reset. As a result, some number of timing errors may be determined and updates to the counts occur prior to any further adjustment to timing.

Still with reference to FIG. 6, instead if the first count does not exceed the second count by the threshold amount, control passes from diamond 530 to diamond 550. Here it is determined whether the second count exceeds the first count by a threshold level. Note that this threshold level may be the same as in diamond 530, or it can be a different value. If it is determined that the second count exceeds the first count by this threshold amount, control passes to block 560 where timing may be adjusted in a second direction. Continuing with the present example, this second direction is to move the timing earlier. Then at block 570, the first and second counts may be reset, as described above.

In another example, a time delay can be updated, and based upon the time delay value, the timing loop may be adjusted and the time delay can be reset. For example:

time_delay=time_delay+alpha*sign(time_error).

If the time_delay>1 or time_delay<1, adjust the timing loop and reset time_delay to zero. In this implementation, alpha could be 0.01, for example, meaning that a minimum of 100 time errors measurements are done to get to a time_delay>1 or time_delay<−1.

In yet another case, the above operation can instead be as follows:

time_delay=time_delay+alpha*time_error;

If the time_delay>1 or time_delay<1, adjust the timing loop and reset time_delay to zero.

Figure 7:
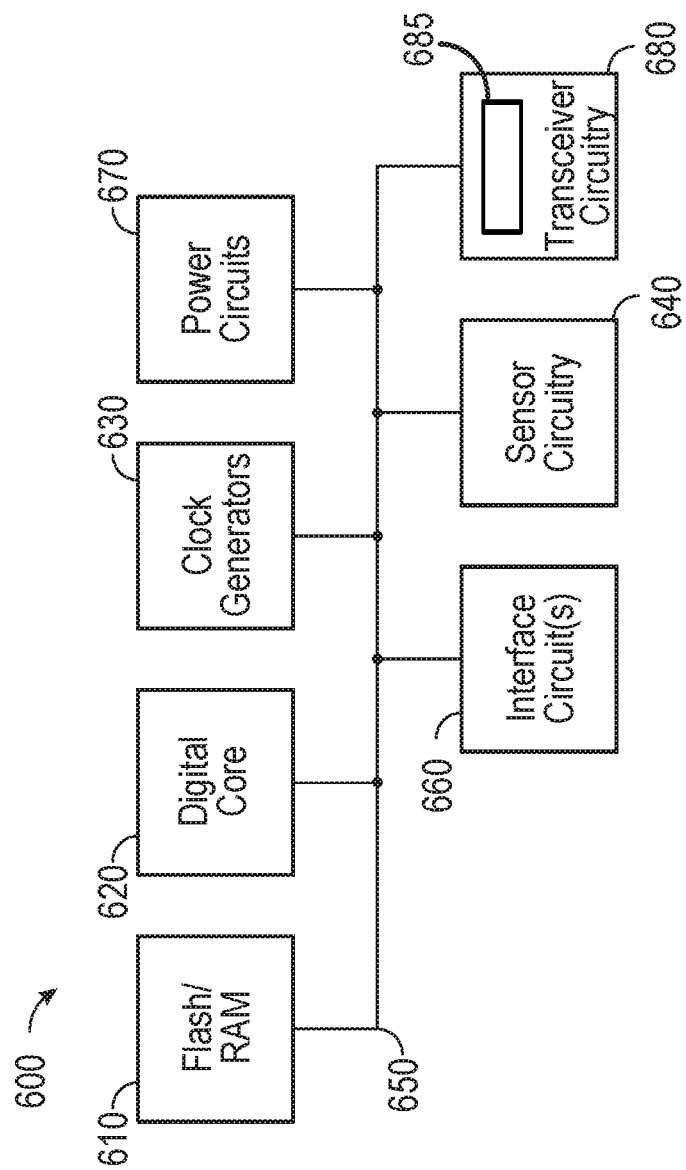
FIG. 7 is a block diagram of a representative wireless device in accordance with an embodiment.

Embodiments may be implemented in many different types of end node devices. Referring now to FIG. 7, shown is a block diagram of a representative device 600 which may be a given wireless device. In the embodiment shown in FIG. 7, device 600 may be a standalone radio, or a radio incorporated into another device such as a sensor, actuator, controller or other device that can be used in a variety of use cases in a wireless control network, including sensing, metering, monitoring, embedded applications, communications applications and so forth.

In the embodiment shown, device 600 includes a memory system 610 which in an embodiment may include a non-volatile memory such as a flash memory and volatile storage, such as RAM. In an embodiment, this non-volatile memory may be implemented as a non-transitory storage medium that can store instructions and data, including code for performing methods including the methods of FIGS. 4-6.

Memory system 610 couples via a bus 650 to a digital core 620, which may include one or more cores and/or microcontrollers that act as a main processing unit of the device. As further shown, digital core 620 may couple to clock generators 630 which may provide one or more phase locked loops or other clock generation circuitry to generate various clocks for use by circuitry of the device.

As further illustrated, device 600 further includes power circuitry 670, which may include one or more voltage regulators. Additional circuitry may optionally be present depending on particular implementation to provide various functionality and interaction with external devices. Such circuitry may include interface circuitry 660 which may provide interface with various off-chip devices, sensor circuitry 640 which may include various on-chip sensors including digital and analog sensors to sense desired signals, such as speech inputs, image inputs, environmental inputs or so forth.

In addition as shown in FIG. 7, transceiver circuitry 680 may be provided to enable transmission and receipt of wireless signals, e.g., according to one or more digital radio communication standards such as DAB, DRM or HD™ radio, local area wireless communication schemes, such as a given IEEE 802.11 scheme, wide area wireless communication scheme such as LTE or 5G, among others. And as shown transceiver circuitry 680 includes a timing control circuit 685, which may perform timing estimates as described herein. Understand while shown with this high level view, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a buffer to store orthogonal frequency division multiplexing (OFDM) samples of one or more OFDM symbols;
   a fast Fourier transform (FFT) engine coupled to the buffer, the FFT engine to receive the OFDM samples of the one or more OFDM symbols and convert each of the OFDM samples of the one or more OFDM symbols into a plurality of frequency domain sub-carriers; and
   a timing control circuit coupled to the buffer, wherein the timing control circuit is to control a timing of the one or more OFDM symbols based at least in part on a difference between a first correlation sum for a first portion of a cyclic prefix of a first one of the one or more OFDM symbols and a second correlation sum for a second portion of the cyclic prefix.

2. The apparatus of claim 1, wherein the timing control circuit is to control the timing according to a difference between the first correlation sum and the second correlation sum of the one or more OFDM symbols received via a multi-path channel.

3. The apparatus of claim 2, wherein the timing control circuit is to adjust the timing until the first correlation sum is at least substantially equal to the second correlation sum.

4. The apparatus of claim 1, wherein the timing control circuit is to control a timing of the buffer to control the timing of the one or more OFDM symbols.

5. The apparatus of claim 1, wherein the timing control circuit is to adjust a sampling clock signal to control the timing of the one or more OFDM symbols.

6. The apparatus of claim 1, wherein the timing control circuit comprises:
   a cyclic prefix correlator to:
      calculate first cyclic prefix correlations for the first portion of the cyclic prefix and second cyclic prefix correlations for the second portion of the cyclic prefix; and calculate first guard band correlations for one or more first guard band samples adjacent the first portion of the cyclic prefix and second guard band correlations for one or more second guard band samples adjacent the second portion of the cyclic prefix; and a summer to calculate the first correlation sum based on the first cyclic prefix correlations and the first guard band correlations and calculate the second correlation sum based on the second cyclic prefix correlations and the second guard band correlations.

7. The apparatus of claim 6, wherein the timing control circuit further comprises an error determination circuit to determine a timing error based on a comparison of the first correlation sum and the second correlation sum.

8. The apparatus of claim 7, wherein the timing control circuit further comprises an error tracking circuit to maintain a first count and a second count based on the timing error for a plurality of comparisons of the first correlation sum and the second correlation sum.

9. The apparatus of claim 8, wherein the timing control circuit is to compare the first count to the second count and adjust at least one of a timing of an output of the OFDM samples of at least one of the one or more OFDM symbols from the buffer and a sampling clock signal based on a comparison of the first count to the second count.

10. The apparatus of claim 8, wherein the timing control circuit is to update one of the first count and the second count when an absolute value of the timing error exceeds a predetermined value.

11. A method comprising:
receiving, in a receiver, a radio frequency (RF) signal;
processing, in the receiver, the RF signal to obtain a plurality of orthogonal frequency division multiplexing (OFDM) symbols, each of the plurality of OFDM symbols comprising cyclic prefix (CP) samples and information samples;
computing a first correlation sum for correlations of a first portion of the CP samples and a guard band portion of the information samples adjacent the first portion of the CP samples;
computing a second correlation sum for correlations of a second portion of the CP samples and a guard band portion of the information samples adjacent the second portion of the CP samples;
determining a timing error based at least in part on the first correlation sum and the second correlation sum; and
adjusting a timing of the receiver based at least in part on the timing error.

12. The method of claim 11, further comprising determining the timing error based on a comparison of the first correlation sum and the second correlation sum.

13. The method of claim 12, further comprising maintaining a first count and a second count based on the timing error for a plurality of comparisons of the first correlation sum and the second correlation sum.

14. The method of claim 13, further comprising adjusting the timing of the receiver in a first direction when the first count exceeds the second count.

15. The method of claim 11, wherein adjusting the timing of the receiver comprises adjusting at least one of a first control signal provided to a buffer of the receiver that stores the plurality of OFDM symbols and a second control signal that controls a sampling clock signal used to sample the RF signal.

16. The method of claim 11, further comprising computing correlations for an entire OFDM symbol for an initial set of the plurality of OFDM symbols to obtain a receiver lock.

17. The method of claim 16, further comprising computing the first correlation sum and the second correlation sum after obtaining the receiver lock.

18. An apparatus comprising:
an amplifier to receive and amplify a radio frequency (RF) signal;
a mixer coupled to the amplifier to downconvert the RF signal to a second frequency signal using a mixing signal;
a digitizer coupled to the mixer to digitize the second frequency signal into samples of a plurality of orthogonal frequency division multiplexing (OFDM) symbols using a sampling clock signal;
a storage coupled to the digitizer to store the samples of the plurality of OFDM symbols; and
a feedback circuit coupled to the storage, wherein the feedback circuit is to control at least one of the sampling clock signal and the storage based at least in part on a comparison between a first correlation sum for a first portion of a cyclic prefix of a first one of the plurality of OFDM symbols and a second correlation sum for a second portion of the cyclic prefix.

19. The apparatus of claim 18, wherein the feedback circuit comprises:
a cyclic prefix correlator to:
calculate first cyclic prefix correlations for the first portion of the cyclic prefix and second cyclic prefix correlations for the second portion of the cyclic prefix; and
calculate first guard band correlations for one or more first guard band samples adjacent the first portion of the cyclic prefix and second guard band correlations for one or more second guard band samples adjacent the second portion of the cyclic prefix; and
a summer to calculate the first correlation sum based on the first cyclic prefix correlations and the first guard band correlations and calculate the second correlation sum based on the second cyclic prefix correlations and the second guard band correlations.

20. The apparatus of claim 19, wherein the feedback circuit is to determine a timing error based on a comparison of the first correlation sum and the second correlation sum, maintain a first count and a second count based on the timing error for a plurality of comparisons of the first correlation sum and the second correlation sum, and adjust at least one of a timing of an output of the samples of the plurality of OFDM symbols from the storage and the sampling clock signal based on a comparison of the first count to the second count.

* * * * *